United States Patent
Hsia

(10) Patent No.: US 9,986,619 B2
(45) Date of Patent: *May 29, 2018

(54) LINEAR SOLID-STATE LIGHTING WITH ELECTRIC SHOCK PREVENTION

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/649,392

(22) Filed: Jul. 13, 2017

(65) Prior Publication Data
US 2017/0311397 A1 Oct. 26, 2017

Related U.S. Application Data

(63) Continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No.
(Continued)

(51) Int. Cl.
*H05B 33/08* (2006.01)
*F21Y 115/10* (2016.01)
*F21K 9/278* (2016.01)

(52) U.S. Cl.
CPC ....... *H05B 33/089* (2013.01); *H05B 33/0809* (2013.01); *F21K 9/278* (2016.08); *F21Y 2115/10* (2016.08)

(58) Field of Classification Search
None
See application file for complete search history.

(56) References Cited

U.S. PATENT DOCUMENTS 6,525,914 B1 * 2/2003 Legatti .................... H02H 3/14
361/42
9,480,123 B2 * 10/2016 Van Dijk ........... H05B 33/0884
(Continued)

*Primary Examiner* — Minh D A
*Assistant Examiner* — James H Cho
(74) *Attorney, Agent, or Firm* — Han IP Corporation; Andy M. Han

(57) ABSTRACT

A linear light-emitting diode (LED)-based solid-state lamp comprises an LED driving circuit, LED arrays, at least one rectifier, and an electric current flow control module. The LED driving circuit comprises a control loop compensation device with a control loop correction signal to precisely control an electric current to flow into the LED arrays. The electric current flow control module uses the control loop correction signal in a way that it detects and determines if the linear LED-based solid-state lamp is operated in a normal mode or in an electric shock hazard mode. When an electric shock hazard is identified, the electric current flow control module shuts off a return current flow from the LED arrays to reach the at least one rectifier, thus eliminating an overall through-lamp electric shock current. The scheme can effectively prevent a through-lamp electric shock from occurring during relamping or maintenance.

17 Claims, 4 Drawing Sheets

Related U.S. Application Data

14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2014/0191659 A1* | 7/2014 | Wu | H05B 33/0812 |
| | | | 315/53 |
| 2016/0356473 A1* | 12/2016 | Van Delden | F21V 25/04 |

* cited by examiner

LINEAR SOLID-STATE LIGHTING WITH ELECTRIC SHOCK PREVENTION

CROSS-REFERENCE TO RELATED APPLICATIONS

The present disclosure is part of a continuation-in-part (CIP) application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and currently pending, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps and more particularly to a linear LED lamp with electric shock detection and prevention, configured to shut off an accidental LED current to reach ground through a person's body.

Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. As LED technologies develop with the drive for energy efficiency and clean technologies worldwide, more families and organizations will adopt LED lighting for their illumination applications. In this trend, the potential safety concerns such as risk of electric shock become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

In the U.S. patent application Ser. No. 14/688,841, filed Apr. 16, 2015, two shock prevention switches and an all-in-one driving circuit are adopted in an LLT lamp such that AC power from either an electronic ballast or the AC mains can operate the lamp without operational uncertainty and electric shock hazards. In other words, no matter what a lamp fixture is configured as the AC mains or an electronic ballast compatible fashion, the LLT lamp automatically detects configurations and works for either one. All of such LLT lamps, no matter whether AC mains-operable or ballast compatible, are electrically wired as double-ended and have one construction issue related to product safety and needed to be resolved prior to wide field deployment. This kind of LLT lamps, if no shock prevention scheme is adopted in, always fails a safety test, which measures a through-lamp electric shock current. Because an AC-mains voltage applies to both opposite ends of the tube when connected to a power source, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its safety standard, UL 935, Risk of Shock During Relamping (Through Lamp), to do a current leakage test and to determine if the LLT lamps meet the consumer safety requirement. Although the LLT lamps used with an electronic ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the electronic ballast. Therefore, a universal LLT lamp that can work with either the AC mains or the electronic ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with an electronic ballast. Unlike an AC voltage of 120 or 277 V/50-60 Hz from the AC mains, the output AC voltage and current from the electronic ballast presents a negative resistance characteristic. The feature that originally supports a fluorescent tube to function properly becomes extremely detrimental to the conventional shock prevention switch due to the electric arc likely occurring between two electrical contacts that have a high electric potential difference with a high frequency, such as 600 V/50 kHz. Once a consumer fails to follow installation instructions to install or uninstall linear LED tube lamps such that one of two ends of the tube lamp is in the fixture socket connected to a powered electronic ballast, and the other end is tweaked to connect to or disconnect from the associated socket, an internal arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50~60 Hz from the AC mains does not have such an issue because its voltage is relatively low compared with the ballast output voltage of 600 V. Moreover, the AC frequency of 60 Hz automatically extinguishes an arc every 1/60 seconds, if existed. That is why a utility switch can be used in an electrical appliance to turn power on and off without any problem. However, when used with the electronic ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Today, such LLT lamps are mostly used in a ceiling light fixture with a wall-mount power switch. The ceiling light fixture could be an existing one used with fluorescent tubes but retrofitted for LLT lamps or a specific LLT lamp fixture. The drivers that provide a proper voltage and current to LED arrays could be internal or external ones. Not like LLT lamps with an external driver that is inherently electric-shock free if the driver can pass a dielectric withstand test used in the industry, LLT lamps with an internal driver could have a shock hazard during relamping or maintenance, when the substantial through-lamp electric shock current flows from any one of AC voltage inputs through the internal driver connecting to LED arrays to the earth ground. Despite this disadvantage, LLT lamps with the internal driver still receive wide acceptance because they provide a stand-alone functionality and an easy retrofit for an LLT lamp fixture. As consumerism develops, consumer product safety becomes extremely important. Any products with electric shock hazards and risk of injuries or deaths are absolutely not acceptable for consumers. However, commercially available LLT lamps with internal drivers, single-ended or double-ended, fail to provide effective solutions to the problems of possible electric shock and internal arcing and fire.

In the prior art mentioned above, the double shock protection switches with mechanical actuation mechanisms protruding outwards from both ends of the LLT lamp are proposed to be used in the LLT lamp. However, a length control of the LLT lamp becomes critical to operate the LLT lamp because sometimes the double shock protection switches may not be actuated by the mechanical actuation mechanisms. Also, the conventional LLT lamp is so vulnerable because it may cause internal fire if consumers abusively tweak the mechanical actuation mechanisms at both ends of the LLT lamp operable with an electronic ballast during relamping. It is therefore the purpose of the present disclosure to disclose an electronic approach to electric shock detection and prevention, to be used in the LLT lamp to eliminate above-mentioned electric shock and internal fire hazards and to work more reliably to protect consumers.

SUMMARY

A linear light-emitting diode (LED)-based solid-state lamp comprising two lamp bases respectively connected to two ends of a housing, each lamp base comprising at least one electrical conductor connecting to a lamp fixture socket; at least one rectifier; an LED driving circuit; LED arrays; and an electric current flow control module, is used to replace a fluorescent tube or a conventional LED tube lamp without the electric current flow control module in an existing lamp fixture. The LED driving circuit comprises a control loop compensation device that is originally used to precisely control a closed-loop electric current to flow into the LED arrays. The electric current flow control module uses the same control loop compensation device in a way that it detects an electric shock and determines if the LED-based solid-state lamp is operated in a normal mode or in an electric shock hazard mode. When an installer touches an exposed at least one electrical conductor on a lamp base in an electric shock hazard, the electric current flow control module detects such an electric shock hazard and shuts off a return current flow from the LED arrays to reach the at least one rectifier, thus eliminating an overall through-lamp electric shock current.

The electric current flow control module comprises an electric shock detection module, a timer and power-up control, a logic control module, a switch control device, and at least one switch configured to connect or disconnect the electric current return from the LED arrays. The at least one switch is connected between the LED arrays and the at least one rectifier. When the control loop compensation device sends a control loop correction signal to the electric current flow control module, the electric shock detection module detects if an electric shock occurs. Because an input voltage to the LED driving circuit decreases when such an electric shock occurs whereas the LED driving circuit is designed to provide the LED arrays with a predetermined current over a wide range of the input voltages, a voltage drop due to the electric shock causes a closed-loop current control signal to vary in response to the electric shock. Therefore, the control loop correction signal from the control loop compensation device can be used to detect the electric shock that occurs at an exposed at least one electrical conductor. The electric current flow control module controls the at least one switch to connect or disconnect the electric current flow over the at least one switch, thus turning on or off the power delivering to the LED arrays. The timer and power-up control manages initial timing sequences in the electric current flow control module to enable or disable power to deliver into the electric shock detection module and the logic control module in order to reduce its power consumption and current to meet maximum leakage current requirement. The logic control module in the electric current flow control module manages several electric shock scenarios and maintains the at least one switch in its "on" or "off" state even after power is removed from the timer and power-up control. For instance, once the electric shock is detected when the first bi-pin in LLT lamp is inserted in a socket and the second bi-pin is exposed and touched by an installer, the logic control module maintains the at least one switch in "off" state until the exposed at least one electrical conductor is removed from the installer and normally installed in the lamp fixture socket receiving a normal AC voltage. When the electric shock detection module detects no electric shock, the electric current flow control module controls the at least one switch to continue "on", thus the electric current being able to continue to flow out from the LED arrays. The scheme can effectively reduce a risk of electric shock hazard to users during relamping or maintenance.

The LED driving circuit further comprises a Buck control circuit comprising a power factor correction (PFC) and control device, an electronic switch with its on and off controlled by the PFC and control device, an inductor with its current charging and discharging controlled by the electronic switch, and a diode. The control loop compensation device is always connected at a low electric potential side along an LED current path with a low electric potential terminal of the control loop compensation device directly connecting to the at least one rectifier through the at least one switch in the electric current flow control module.

Although configurations of a Buck control circuit may be different for different designs, the control loop compensation device originally working with the Buck control circuit can effectively provide a control loop correction signal for the electric current flow control module to detect the electric shock and manage to shut off the electric shock current.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
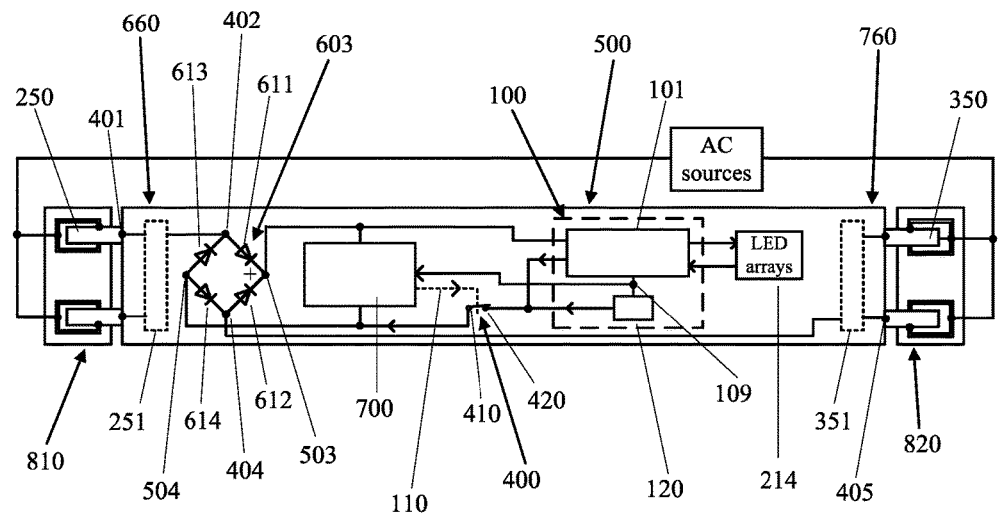
FIG. 1 is an embodiment of an LLT lamp installed in lamp fixture sockets connected with AC power sources according to the present disclosure.

FIG. 1 is an embodiment of an LLT lamp installed in lamp fixture sockets connected with alternate current (AC) sources according to the present disclosure. The LLT lamp 500 comprises a housing having two ends; two lamp bases 660 and 760 each having at least one electrical conductor 250 and 350 at each end of the housing; an electric current flow control module 700; a pair of electrical contacts 410 and 420 of at least one switch 400 controlled by the electric current flow control module 700; at least one rectifier 603 comprising diodes 611, 612, 613, and 614 interconnected at ports 402, 404, 503, and 504; an LED driving circuit 100 having a first and a second inputs 503 and 420; and LED arrays 214 disposed between the two ends of the housing with the LED arrays 214 connected to the LED driving circuit 100. The LLT lamp 500 may further comprise an interface module 251 and 351 for each lamp base configured to work with an electronic ballast for maximum compatibility. The interface module may comprise a resistor, a resistor in parallel with capacitor, a jumper, or simply a passing-through connection such as a direct connection between a connection point 401 and the interconnection port 402 for the interface module 251 and a direct connection between a connection point 405 and the interconnection port 404 for the interface module 351. In the context followed, such direct connections will be used for simplicity unless otherwise specified. Please note that neither of the interface modules 251 and 351 includes a fuse or any EMI (electromagnetic interference) filters.

The LED driving circuit 100 comprises a Buck control circuit 101 and a control loop compensation device 120 connected to the Buck control circuit 101, which is further connected to the LED arrays 214. When the at least one electrical conductor 250 and the at least one electrical conductor 350 in each lamp base are respectively inserted into the lamp fixture sockets 810 and 820, the at least one rectifier 603 receives AC power through the at least one electrical conductors 250 and 350 at each end of the housing and converts into a DC (direct current) voltage to supply the LED driving circuit 100. A normal LED current will flow into the LED arrays 214 and return to the Buck control circuit 101. The control loop compensation device 120 receives a signal from the Buck control circuit 101 and maintains a voltage signal at a port 109 connecting to electric current flow control module 700. Because the at least one electrical conductor 250 and the at least one electrical conductor 350 in each lamp base are inserted into the lamp fixture sockets 810 and 820, the at least one rectifier 603 receives a normal input AC voltage and converts into a DC voltage without a compromise. The Buck control circuit 101 delivers a current equal to a preset value to the LED arrays 214. In this case, the voltage signal appearing at the port 109 relative to ground represents a voltage value in a normal mode. The electric current flow control module 700 receives the voltage signal appearing at the port 109, determines that no electric shock occurs, and controls the at least one switch 400 to turn on through a control link 110 such that the electrical contacts 410 and 420 of the at least one switch 400 are electrically connected. Whereas the at least one switch 400 is on, the electric current returned from the LED arrays 214 and the Buck control circuit 101 can flow back to the at least one rectifier 603 to complete a power transfer.

When either one of the at least one electrical conductor 250 and the at least one electrical conductor 350 in each lamp base is inserted into the lamp fixture sockets 810 or 820 that is connected with "L" of AC mains, the LLT lamp 500 does not light up but is live and energized, meaning that there is an electric shock hazard. If an installer touches the exposed at least one electrical conductor 250 or at least one electrical conductor 350 in each lamp base without the at least one switch 400 in place to control the current returned from the LED arrays 214, an electric shock current can flow from the LED arrays 214 through the Buck control circuit 101 and the at least one switch 400 to reach the at least one rectifier 603, further flowing to earth ground through the installer's body, creating an electric shock hazard. However, when such a situation occurs, the at least one rectifier 603 receives a compromised AC voltage according to a divided voltage because a human body is analogous to a 500 ohm-resistor. When a DC voltage provided by the at least one rectifier 603 is not as high as a normal DC voltage, an electric current provided to drive the LED arrays 214 by the Buck control circuit 101 is lower than a preset value, the same as the electric current returned from the LED arrays 214 to the Buck control circuit 101. The Buck control circuit 101 detects a current decrease and sends a correction signal internally to compensate the current decrease. This forms a closed control loop. The control loop compensation device 120 receives the correction signal from the Buck control circuit 101 and maintains the correction voltage signal at the port 109. Thus, the electric current flow control module 700 can detect electric shock and control the at least one switch 400 through the control link 110 to turn off an electrical connection between the electrical contacts 410 and 420 of the at least one switch 400. Thus, the electric shock current is blocked, no substantial leakage current possibly flowing out to the exposed at least one conductor on either lamp base. As can be seen in FIG. 1, two sockets in each of the external fixture lamp sockets 810 and 820 are shunted, meaning that as long as both the at least one electrical conductor 250 in the lamp base 660 and the at least one electrical conductor 350 in the lamp base 760 connect to the AC power sources, the LLT lamp 500 can get a power to operate. Furthermore, as long as an operating current that operates the electric current flow control module 700 is within a certain limit specified by UL standard 935, the LLT lamp 500 can be deemed safe for users because a through-lamp electric current is restricted to the operating current of the electric current flow control module 700 rather than a substantial current flow returned from the LED arrays 214 once the electric shock occurs.

Figure 2:
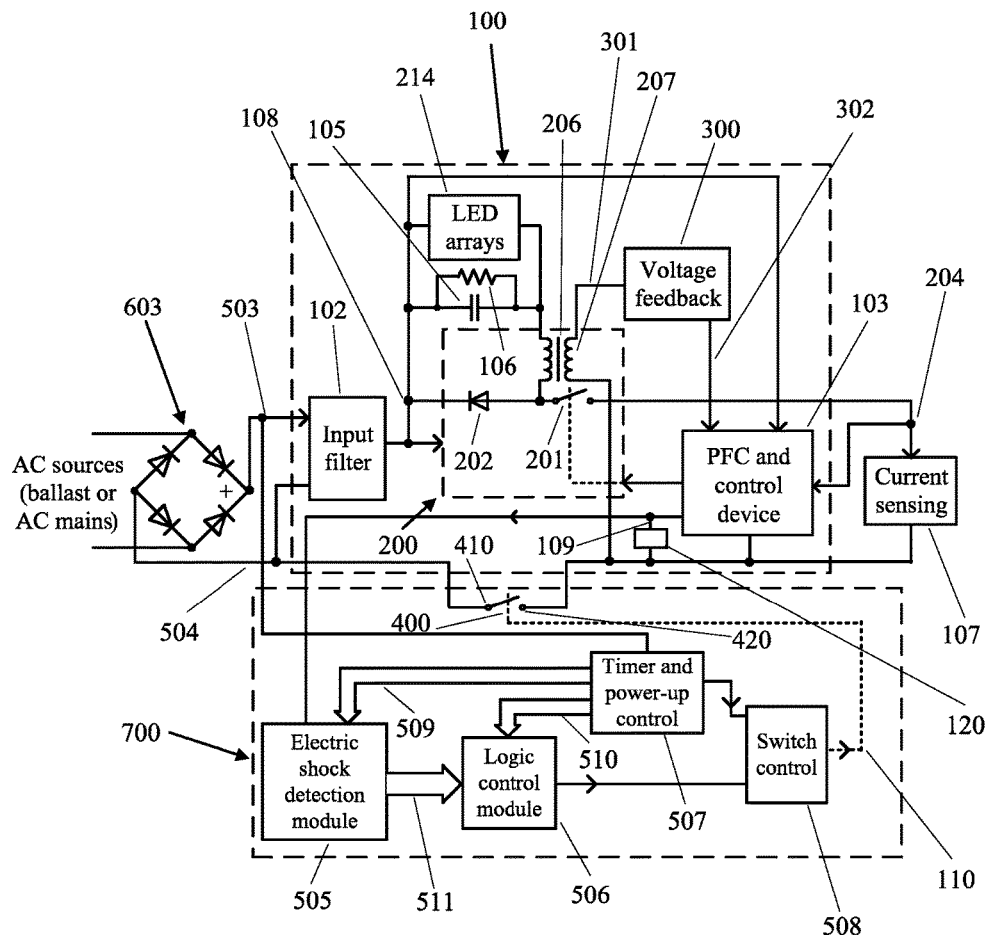
FIG. 2 is an embodiment of an LED driving circuit configured to work with an electric current flow control module to detect an electric shock according to the present disclosure.

FIG. 2 is an embodiment of an LED driving circuit configured to work with an electric current flow control module to detect an electric shock according to the present disclosure. The at least one rectifier 603 connecting to an AC power source, either the AC mains or an electronic ballast, converts an AC into a DC voltage. The LED driving circuit 100 comprises a Buck control circuit, connecting to the at least one rectifier 603, comprising an input filter 102 used to filter the input voltage and to suppress EMI noise created in the LED driving circuit 100, a power factor correction (PFC) and control device 103, a Buck converter 200 in communicating with the PFC and control device 103, a switch 201 controlled by the PFC and control device 103, an output capacitor 105 in parallel with a resistor 106 connected to the Buck converter 200 to build up an output voltage and to power the LED arrays 214, a current sensing device 107, and a voltage feedback module 300 extracting partial energy from the output voltage to sustain the PFC and control device 103. The at least one rectifier 603 has four input/output ports, among which a high electric potential appears at the input/output port 503, and a low electric potential appears at the input/output port 504 respectively connecting to the high side and the low side of the input filter 102 with the low electric potential port 504 as a common ground. The LED driving circuit 100 further comprises a control loop compensation device 120. The control loop compensation device 120 receives a control loop correction signal from the PFC and control device 103 and maintains the control loop correction voltage signal at a port 109 as an input to the electric current flow control module 700. Thus, the electric current flow control module 700 can detect electric shock and control the at least one switch 400 through the control link 110 to turn off an electrical connection between the electrical contacts 410 and 420 of the at least one switch 400.

In FIG. 2, when the power is on, an input current enters the input filter 102 and then the PFC and control device 103, turning on the switch 201. Whereas the diode 202 is reverse-biased, the input current goes from the resistor 106 and the LED arrays 214, a primary winding of the transformer 206, the switch 201, and the current sensing device 107 to the common ground 504. The primary winding of the transformer 206 serves as an inductor. When the input current goes into the primary winding of the transformer 206, energy is stored in it. The PFC and control device 103 detects the input voltage level and control the switch 201 on and off in a way that a desired or otherwise predetermined output voltage $V_o$ across the LED arrays 214 is reached to light up the LED arrays 214. When the switch 201 is off, the diode 202 is forward-biased, and the primary winding of the transformer 206 releases the energy stored, resulting in a loop current flowing from the diode 202 and the LED arrays 214, back to the primary winding of the transformer 206, completing the energy transfer to the LED arrays 214. When the switch 201 is on, the input current flows into the LED arrays 214, the primary winding of the transformer 206, the switch 201, and the current sensing device 107, creating a voltage drop across the current sensing device 107. The voltage appearing at the port 204 of the current sensing device 107 inputs to the PFC and control device 103 to control the off-time of the switch 201. The voltage feedback module 300 has two connection ports 301 and 302, with the first connection port 301 connecting to a high side of a secondary winding 207 in the transformer 206 and with the second connection port 302 connecting to the PFC and control device 103. The voltage feedback module 300 continuously monitors the output voltage by using the secondary winding 207 in the transformer 206. When the voltage at the high side of the secondary winding 207 is higher than a becoming lower operating voltage in the PFC and control device 103 due to increased internal operations, the diode (not shown) in the voltage feedback module 300 conducts to supply energy in time through the second connection port 302 to sustain the operating voltage in the PFC and control device 103. In brief, as long as the PFC and control device 103 continues to receive power and to maintain its operation, the switch 201 is controlled to turn on and off such that the electric current continues to pump into and out of the LED arrays with a preset value.

In FIG. 2, the LED driving circuit 100 is further connected to the electric current flow control module 700 via the port 109 with the control loop correction voltage signal directly entering the electric current flow control module 700. The electric current flow control module 700 comprises an electric shock detection module 505, a logic control module 506, a timer and power-up control 507, a switch control device 508, and at least one switch 400 configured to connect or disconnect the electric current return from the LED arrays 214. The electric shock detection module 505 receives the control loop correction voltage signal from the port 109 connecting to the control loop compensation device 120. The control loop correction voltage signal from the port 109 represents a closed loop control signal to control the current flowing into and out of the LED arrays 214 to the preset value mentioned above. When an electric shock occurs, the supplied DC voltage from the at least one rectifier 603 drops, the control loop correction voltage signal from the control loop compensation device 120 tends to increase to compensate the voltage drop in order to maintain the current flowing into and out of the LED arrays 214 to the preset value. The electric shock detection module 505 compares the control loop correction voltage signal with reference voltages associated with different input voltages, determines if the electric shock occurs, and converts an analog voltage signal into a bilevel signal to send to the logic control module 506 via a data bus 511, subsequently controlling the switch control device 508 to control the at least one switch 400 to switch on when an electric shock is not detected or to switch off when an electric shock is detected. The reference voltages are preset as an optimum threshold to minimize an error probability of the through-lamp electric shock detection. The timer and power-up control 507 dictates the switch control device 508 to turn on the at least one switch 400 only for a short power-up period after the power is on no matter whether an input voltage is normal or compromised due to the electric shock. After the short power-up period, the logic control module 506 takes over the control of the switch control device 508 to turn the at least one switch 400 on or off based on the bilevel signal received. The logic control module 506 comprises one or more one-bit memory to latch the at least one switch 400 in a way that the at least one switch 400 will remain "on" if the electric shock is not detected and remain off if the electric shock is detected in the short power-up period. This function ensures that the LLT lamp can operate more reliably without flickering when an input voltage accidentally becomes lower than a normal line voltage due to possible power grid fluctuations for a long run. In FIG. 2, the electric current flow control module further comprises a detection and timing signal data bus 509 between the timer and power-up control 507 and the electric shock detection module 505 and a timing signal data bus 510 between the timer and power-up control 507 and the logic control module 506. Details of timing sequences will be discussed in FIG. 4 and FIG. 5.

Figure 3:
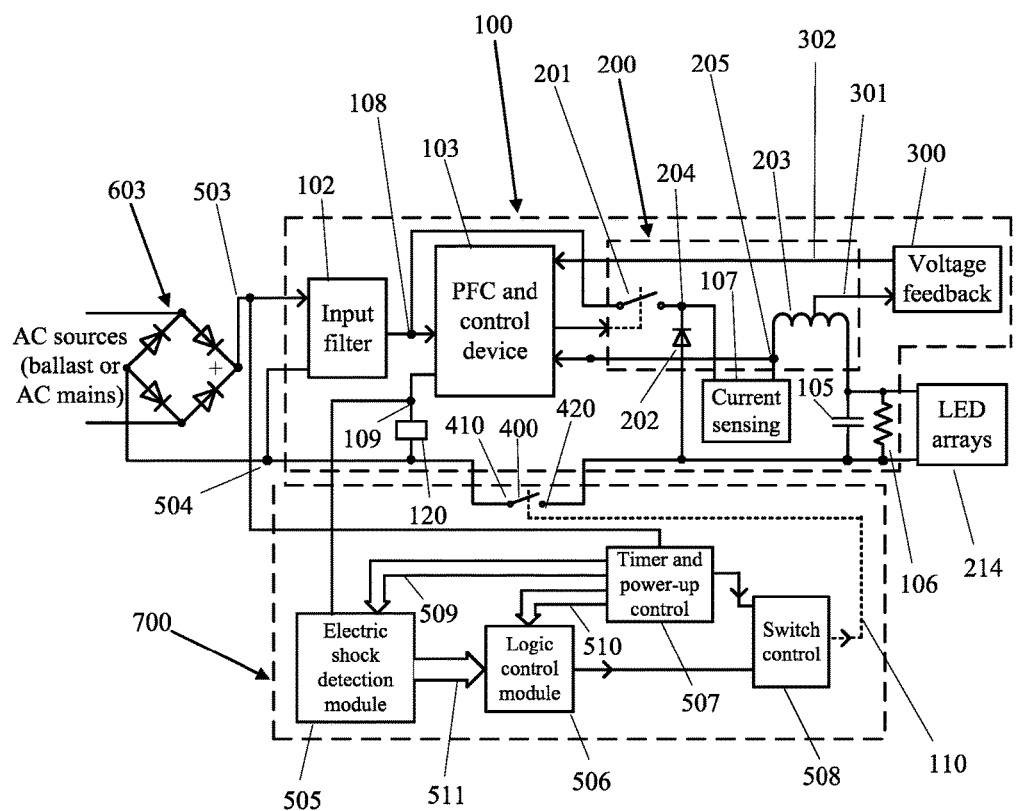
FIG. 3 is another embodiment of an LED driving circuit configured to work with an electric current flow control module to detect electric shock current according to the present disclosure.

FIG. 3 is another embodiment of an LED driving circuit configured to work with an electric current flow control module to detect electric shock according to the present disclosure. FIG. 3 has all the components as in FIG. 2, except that interconnections are different, that the control loop compensation device 120 is connected with the at least one switch 400 at the electrical contact 410 in the at least one switch 400, and that a center-tapped inductor 203 in FIG. 3 replaces the transformer 206 in FIG. 2. In FIG. 3, the same numerals are used for the same components as in FIG. 2. In FIG. 3, the Buck converter 200 comprises a switch 201 controlled by the PFC and control device 103, a diode 202, and an inductor 203 with its current charging and discharging controlled by the switch 201. The PFC and control device 103 detects zero current in the inductor 203 within an AC cycle of an input voltage generating a zero-current detection signal and controls the switch 201 on and off with a constant on-time and a varied off-time controlled by the zero-current detection signal. By adapting switching frequencies for a high frequency associated with a ballast and a low frequency associated with the AC mains, the PFC and control device 103 controls the switch 201 on and off in a way that the inductor 203 is charged during on-time and discharged during off-time, and that a desired or otherwise predetermined output voltage $V_o$ across the LED arrays 214 is reached to light up the LED arrays 214. The average inductor current is thus equal to the output current that flows into the LED array 214. When the switch 201 is on, the diode 202 is reverse-biased, and an input current flows from an output port 108 in the input filter 102, the switch 201, the first port 204 of the current sensing device 107, the current sensing device 107 itself, and the second port 205 of the current sensing device 107, into the inductor 203. When the current flowing into the inductor 203 increases, the voltage across the current sensing device 107 increases. The first port 204 of the current sensing device 107 also connects with the PFC and control device 103, which continuously receives signals and adjusts the off-time such that the output voltage and current to the LED arrays 214 are regulated to meet the output requirements. The output capacitor 105 in parallel with the resistor 106 connects to the inductor 203, receiving energy to build up an output voltage and to power the LED arrays 214.

The inductor 203 configured as an autotransformer has a center-tapped port connecting to the voltage feedback module 300 comprising a diode. The voltage feedback module 300 has two connection ports 301 and 302, with the first connection port 301 connecting to the center-tapped port of center-tapped inductor 203 and with the second connection port 302 connecting to the PFC and control device 103. The PFC and control device 103 has an input capacitor (not shown) with a voltage built up to supply an internal logic control circuit (not shown) in the PFC and control device 103. When the voltage decreases due to its increased internal operations and controls, and when the voltage at the center-tapped port of the inductor 203 is higher than the supplying voltage, the diode in the voltage feedback module 300 conducts to supply a current to the PFC and control device 103 and sustain its operations. The function of the voltage feedback module 300 is essential because the LED driving circuit 100 has a wide range of operating voltages not only 110 and 277 VAC for AC mains but also 350~600 VAC for an electronic ballast. In the PFC and control device 103, a start-up resistor (not shown) is so designed to operate a LLT lamp at the lowest input voltage 110 VAC. When the highest voltage 600 VAC from the electronic ballast comes in, a higher proportional voltage appears at an input of the internal logic control circuit. Therefore, an operating voltage for the internal logic control circuit must be in a wide range such as 11~35 VDC rather than 5~15 VDC as in a conventional logic control device. To meet requirements of start-up time and current without turn-on failure or flickering occurred at the lamp start-up, the input capacitor in the PFC and control device 103 with a minimum capacitance is designed and used at the input of the internal logic control circuit. The voltage feedback module 300 is thus needed to pump in energy in time and to sustain the operating voltage and ensure no flickering occurred when operating the LLT lamp.

When the switch 201 is off, the diode 202 is forward-biased, and the inductor 203 discharges with a loop current flowing from the LED arrays 214, the diode 202, the current sensing resistor 107, back to the inductor 203. The current sensing resistor 107 keeps track of the output current and feedbacks to the PFC and control device 103 to further control the switch 201 on and off. The closed loop operation in both on-time and off-time of the switch 201 ensures the output current to be accurately controlled within 4%.

In FIG. 3, the LED driving circuit 100 is also connected to the electric current flow control module 700 for electric shock detection as in FIG. 2. Same as in FIG. 2, the electric shock detection module 505 in the electric current flow control module 700 receives the control loop correction voltage signal from the control loop compensation device 120 and detects for a short period after the power is on to see if the electric shock occurs. No matter whether the electric shock is detected or not, a bilevel voltage signal is generated by the electric shock detection module 505 and sent to the logic control module 508 to process. The logic control module 508 manages several scenarios, integrates results from the several scenarios, and sends a signal to the switch control, subsequently controlling the at least one switch 400 to turn "on" or "off". If the electric shock is detected, the at least one switch 400 is turned "off", thus blocking the electric shock current to flow to the earth ground through the installer's body. On the other hand, if the electric shock is not detected for a short power-up period after the power is on, the electric current flow control module 700 controls the at least one switch 400 to turn on and continue on, thus allowing the current return from the LED arrays 214 to reach the earth ground and completing an energy transfer to the LED arrays 214 for lighting.

Figure 4:
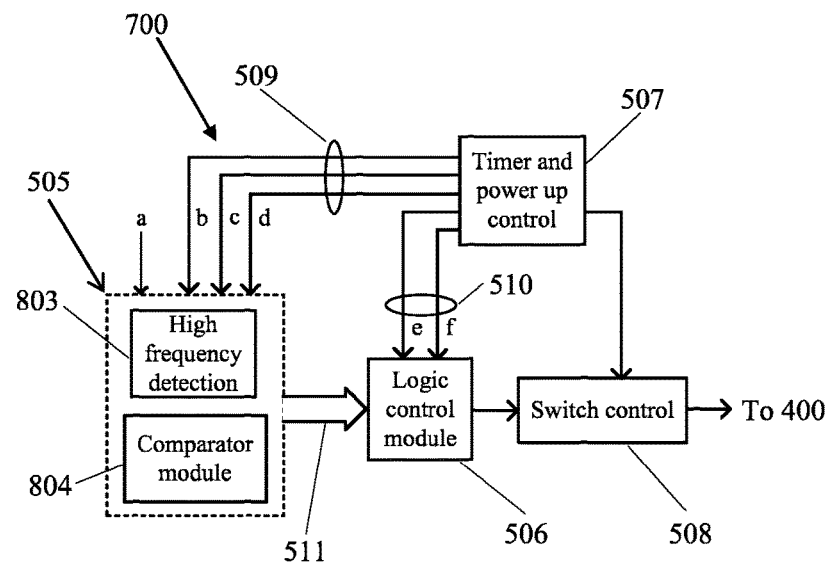
FIG. 4 is an embodiment of an electric shock detection module and a logic control module configured to work with either an electronic ballast or AC mains.

FIG. 4 is an embodiment of an electric current flow control module configured to work with either an electronic ballast or AC mains. Same as in FIGS. 2-3, the electric current flow control module 700 comprises an electric shock detection module 505, a logic control module 506, a timer and power-up control 507, and a switch control device 508. The electric shock detection module 505 comprises a high frequency detection module 803 configured to detect if the high frequency voltage from the electronic ballast is present and a comparator module 804 configured to determine if the electric shock occurs when a line voltage from AC mains is present. In FIG. 1, when the at least one electrical conductor 250 and the at least one electrical conductor 350 in each lamp base of the LLT lamp 500 are inserted into the lamp fixture sockets 810 and 820, the LLT lamp 500 must first determine if the power is from an electronic ballast or AC mains because there is no concern of electric shock when the LLT lamp 500 operates with the electronic ballast. The AC voltages from the electronic ballast and the AC mains differ significantly in frequency, for instance, 25 kHz and above for the electronic ballast versus 60 Hz for the AC mains. After the AC voltages are rectified by the rectifier 603 (in FIGS. 1-3), the ripples in the DC voltages show a frequency doubled. The frequency difference between the DC voltages rectified from the AC voltages provided by the electronic ballast and the AC mains can be used to detect if the high frequency voltage from the electronic ballast is present. In FIG. 4, if high frequency ripples are detected from the DC voltage rectified, the logic control module 506 dictates a high-level voltage to appear at the switch control device 508, subsequently controlling the at least one switch 400 to turn "on" and to remain "on". On the other hand, if the high frequency ripples are not detected from the DC voltage rectified, the comparator module 804 compares the control loop correction voltage signal appeared at the port 109 from the control loop compensation device 120 and converts the control loop correction voltage signal into a bilevel voltage signal and sent to the logic control module 508 to process. Four scenarios for line voltage operation from the AC mains include 120 VAC-normal, 120 VAC-electric shock, 277 VAC-normal, and 277 VAC-electric shock. Therefore, the comparator module 804 may comprise one or more comparators to precisely detect electric shock over a wide range of input AC voltages. The logic control module 506 manages to integrate these four scenarios and the high frequency scenario into one result, a high-level or a low-level voltage to the switch control device 508 to turn "on" or "off" the at least one switch 400. In this case, the logic control module 506 may further comprise one or more logic gates such as Not gates (inverters), AND gates, and OR gates coupled between the one or more comparators and the one or more one-bit memory devices and between the one or more one-bit memory devices and the switch control device 508.

Figure 5:
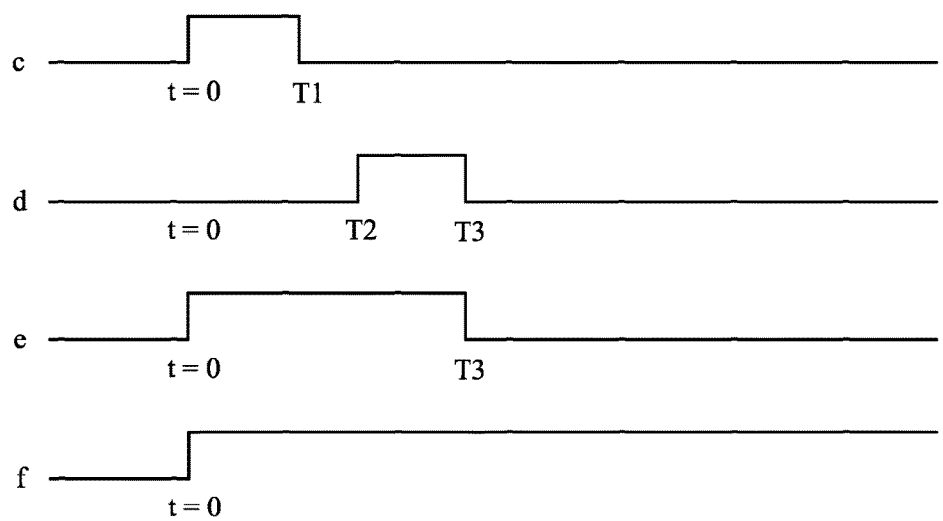
FIG. 5 is timing sequences provided by a timer and power-up control.

FIG. 5 is timing sequences provided by a timer and power-up control to control the high frequency detection module 803, the comparator module 804, and the logic control module 506. Referring to FIG. 4 and FIG. 5, the electric shock detection module 505 comprises two detection ports—"a" and "b" and two timing ports—"c" and "d", whereas the logic control module 506 comprises one data bus 511 and one timing bus comprising two timing ports—"e" and "f". The ports "b", "c", and "d" receive data from a bus 509 in FIGS. 2-3. The detection port "a" is connected between the control loop compensation device 120 and the comparator module 804 for the comparator module 804 to detect an electric shock. Whereas the detection port "b" receives a DC voltage with ripples to be detected, the timing signal on the port "c" is sent to and enables the high frequency detection module 803 to detect a ripple frequency and determine if the electronic ballast is present. In FIG. 5, the timing signal on the port "c" starts at t=0 and stops at t=T1.

The timing signal on the port "d" is sent to the comparator module 804 to detect if the electric shock occurs. Outcomes of the high frequency detection and the through-lamp electric shock detection are sent to the logic control module 506 via the data bus 511 in FIGS. 2-4. The timing signal on the port "d" starts at t=T2 and stops at t=T3. The two timing ports—"e" and "f" receive timing information from the timer and power-up control module 507 via the timing bus 510. In FIG. 5, timing sequence on the port "f" is sent to the one or more one-bit memory used to store a status of the outcomes from the high frequency detection and the through-lamp electric shock detection. The one or more one-bit memory receives a high-level voltage at all time starting as soon as the LLT lamp 500 receives the power (t=0). The port "e" receives a high-level voltage to enable the switch control device 508 for a short power-up period from t=0 to t=T3 so that an LED driving current can flow into and out of the LED arrays 214, and the control loop correction voltage signal from the control loop compensation device 120 can be sent to the electric shock detection module 505 to determine if the electric shock occurs. After the detection (t>T3), the port "e" receives a low-level voltage, and the status (a high- or a low-level voltage) on the one or more one-bit memory determines if the switch control device 508 receives the high- or the low-level voltage. That is to say, the timer and power-up control 507 is configured to respectively turn on and off power supplied to the at least one switch 400, the high frequency detection module 803, and one or more comparators 804 in a predetermined timing manner such as T3>T2>T1>0 whereas T3 is less than several milliseconds.

In FIGS. 1-3, the electrical contacts 410 and 420 of the at least one switch 400 may be an electrical, an electronic, an electro-mechanical, or a mechanical switch such as one in a solid-state relay, an electronic relay, an electro-mechanical relay, a pair of mechanical contacts, or other bidirectional and unidirectional current control devices such as a triac, a back-to-back thyristor, a silicon-controlled rectifier (SCR), a transistor, a metal-oxide-semiconductor field-effect transistor (MOSFET), a field-effect transistor (FET), a transistor, or various combinations thereof. Also, such devices may be connected with some snubber circuits to maintain their functionality under voltage spikes. Please note that although the LED arrays 214 are used throughout the context, the LED arrays may mean one or more LED arrays. The control loop compensation device 120 in FIGS. 1-3 may comprise a capacitor or a capacitor in series with a resistor.

Whereas preferred embodiments of the present disclosure have been shown and described, it will be realized that alterations, modifications, and improvements may be made thereto without departing from the scope of the following claims. Another kind of the through-lamp electric shock prevention schemes in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
    a housing having two ends;
    one or more LED arrays disposed between the two ends of the housing;
    an LED driving circuit comprising a control loop compensation device;
    two lamp bases respectively connected to the two ends of the housing, each lamp base comprising at least one electrical conductor configured to insert into a respective lamp fixture socket;
    at least one rectifier configured to convert an alternate current (AC) voltage to a direct current (DC) voltage; and
    an electric current flow control module receiving a control loop correction voltage signal from the control loop compensation device in the LED driving circuit,
    wherein:
        when a through-lamp electric shock is detected in a power-up period, the electric current flow control module disconnects an electric current return from the one or more LED arrays to prevent the electric current return from reaching the at least one rectifier; and
        when the at least one electrical conductor in each lamp base is inserted into the respective lamp fixture socket, the electric current flow control module enables the LED driving circuit to deliver electrical power to the one or more LED arrays.

2. The linear LED tube lamp of claim 1, wherein the electric current flow control module is configured to receive power from the at least one rectifier.

3. The linear LED tube lamp of claim 1, wherein the control loop compensation device in the LED driving circuit is configured to receive the control loop correction signal coupled through the electric current return path from the one or more LED arrays to control the one or more LED arrays in a constant current mode and to send the control loop correction signal to the electric current flow control module to detect if the through-lamp electric shock occurs.

4. The linear LED tube lamp of claim 3, wherein a predetermined electric current return from the LED arrays is preset such that the electric current flow control module operates the linear LED tube lamp with AC mains at voltages/frequency in a range of 100~277 V/60 Hz or with electronic ballasts at voltages/frequency in a range of 350~600 V/40~70 kHz.

5. The linear LED tube lamp of claim 1, wherein the electric current flow control module comprises one or more comparators, a timer and power-up control, a logic control module, a switch control device, and at least one switch configured to connect or disconnect the electric current return from the LED arrays.

6. The linear LED tube lamp of claim 5, wherein each of the one or more comparators is configured to receive an analog signal from the control loop compensation device, to compare the analog signal with an associated reference voltage, to convert the analog signal into a bilevel signal, and to send the bilevel signal to the logic control module, subsequently controlling the switch control device to switch on the at least one switch when the through-lamp electric shock is not detected or to switch off when the through-lamp electric shock is detected.

7. The linear LED tube lamp of claim 6, wherein the associated reference voltage is preset as an optimum threshold to minimize an error probability of the through-lamp electric shock detection.

8. The linear LED tube lamp of claim 6, wherein the logic control module comprises one or more one-bit memory devices configured to latch the at least one switch.

9. The linear LED tube lamp of claim 8, wherein the logic control module further comprises one or more logic gates coupled between the one or more comparators and the one or more one-bit memory devices.

10. The linear LED tube lamp of claim 5, wherein the timer and power-up control is configured to respectively turn on and off the power supplied to the at least one switch and one or more comparators in a predetermined timing manner.

11. The linear LED tube lamp of claim 5, wherein the at least one switch comprises electrical contacts comprising electrical terminals of at least one relay.

12. The linear LED tube lamp of claim 11, wherein the at least one relay comprises a solid-state relay, an electronic relay, or an electro-mechanical relay.

13. The linear LED tube lamp of claim 5, wherein the at least one switch comprises electrical contacts comprising electrical terminals of at least one triac.

14. The linear LED tube lamp of claim 5, wherein the at least one switch comprises electrical contacts comprising electrical terminals of at least one electronic switch.

15. The linear LED tube lamp of claim 14, wherein the at least one electronic switch comprises a metal-oxide-semiconductor field-effect transistor (MOSFET), a field-effect transistor (FET), a transistor, a back-to-back thyristor, a silicon-controlled rectifier (SCR), or a combination thereof.

16. The linear LED tube lamp of claim 1, wherein the electric current flow control module further comprises a high frequency detection module configured to receive a signal from the DC voltage and to determine if the AC voltage is from an electronic ballast.

17. The linear LED tube lamp of claim 1, wherein the control loop compensation device in the LED driving circuit comprises a capacitor or a capacitor in series with a resistor.

* * * * *